May 11, 1937.　　　J. C. RENAULT　　　2,079,814
VEHICLE
Filed March 23, 1936　　2 Sheets-Sheet 1
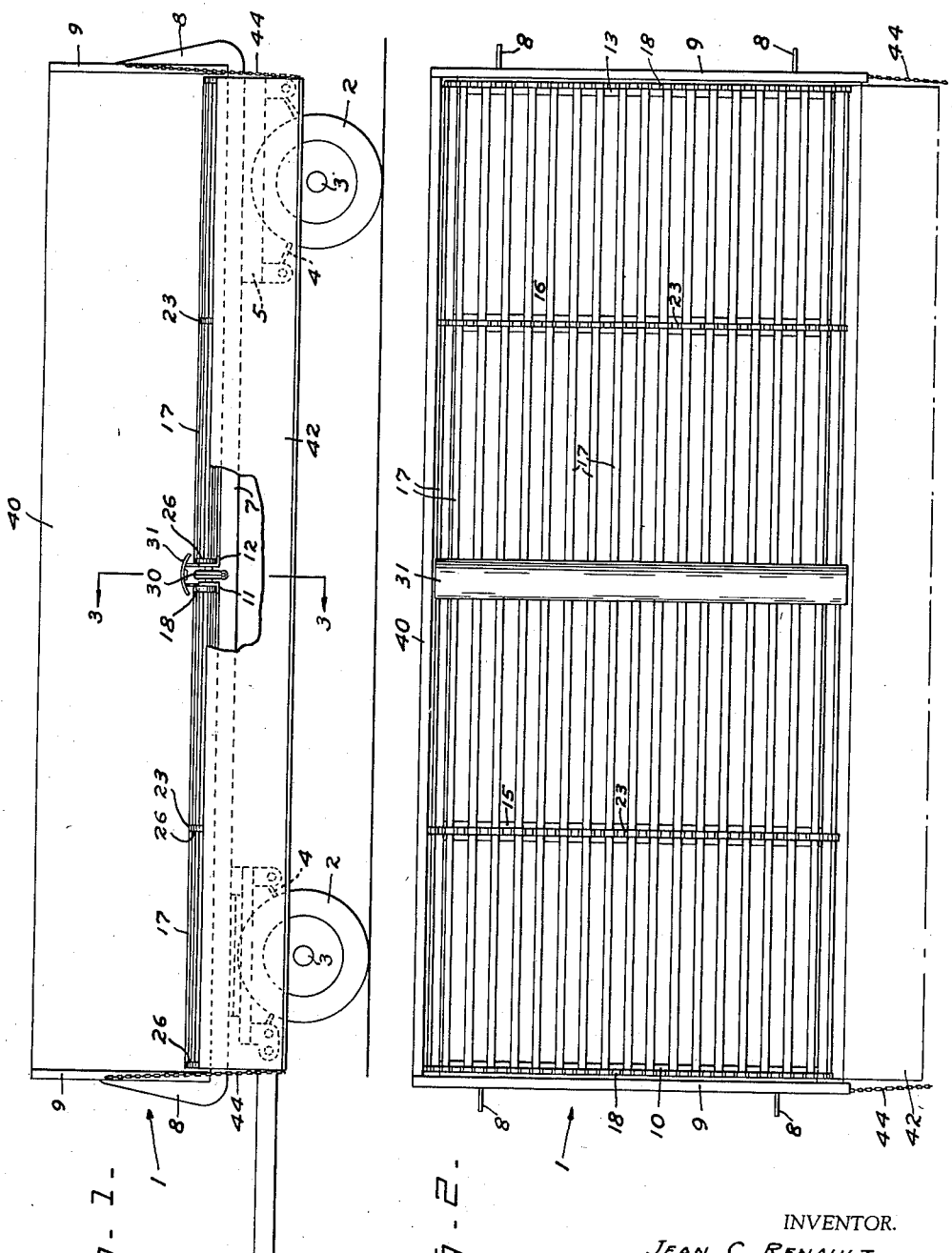
INVENTOR.
JEAN C. RENAULT
BY
ATTORNEY.

May 11, 1937.  J. C. RENAULT  2,079,814
VEHICLE
Filed March 23, 1936  2 Sheets-Sheet 2

INVENTOR.
JEAN C. RENAULT
BY
A. Schapp
ATTORNEY.

Patented May 11, 1937

2,079,814

UNITED STATES PATENT OFFICE 2,079,814

VEHICLE

Jean C. Renault, Salinas, Calif., assignor to Farmers Merchantile Company, Salinas, Calif.

Application March 23, 1936, Serial No. 70,258

7 Claims. (Cl. 214—83)

The present invention relates to improvements in vehicles and has particular reference to a movable floor for a vehicle whereby farm produce or other material disposed on the floor of the vehicle may be easily discharged over an edge of the floor.

More particularly it is proposed to provide a movable floor for a vehicle arranged in such a manner that it will deliver the load over either side of the vehicle.

It is further proposed to provide a movable floor in the form of endless conveyors arranged for side delivery and made in sections while actuated by a common operating means.

It is further proposed to provide suitable mounting and supporting means for the endless conveyor whereby the same are enabled to carry heavy loads and to arrange operating means in such a manner that the power, whether manual or motor, may be applied at the most advantageous point for moving the floor as a unit.

It is further proposed to arrange the conveyors in such a manner that any slack caused by continuous wear may be readily taken up by a simple operation, without the use of any repair parts or extras.

It is a further object of my invention to arrange the sides of the vehicle in such a manner that they may be dropped from vertical position into horizontal or any angular position desired so as to form a receiving platform or chute for the material discharged over the edge of the movable floor.

It is still further proposed to arrange the sides of the vehicle relative to the movable floor in such a manner that if the floor is extended for taking up slack the side of the vehicle affected thereby is automatically adjusted with the floor so that the relative positions remain unchanged.

Further and other objects and advantages of my invention will appear as the specification proceeds.

The preferred form of my invention is illustrated in the accompanying drawings in which—

Figure 3:
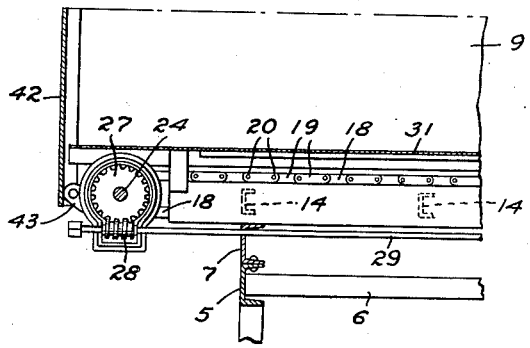
Figure 4:
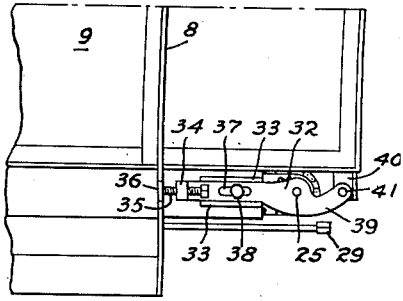
Figure 5:
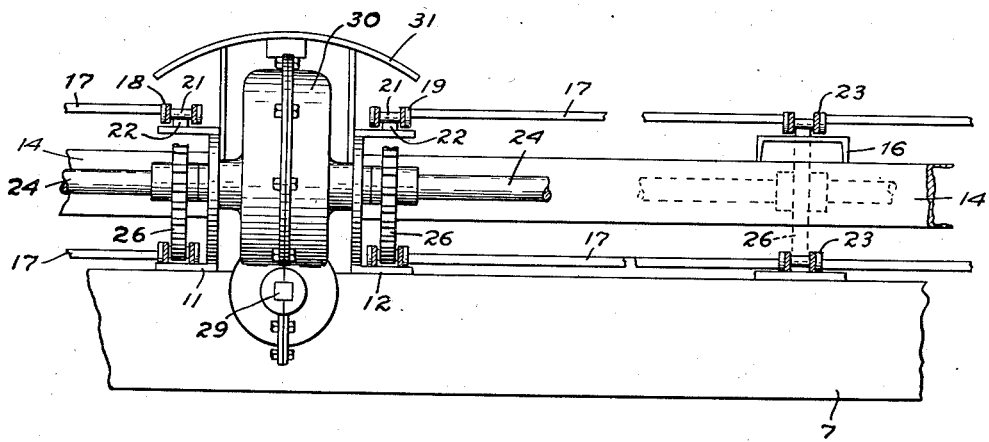
Figure 6:
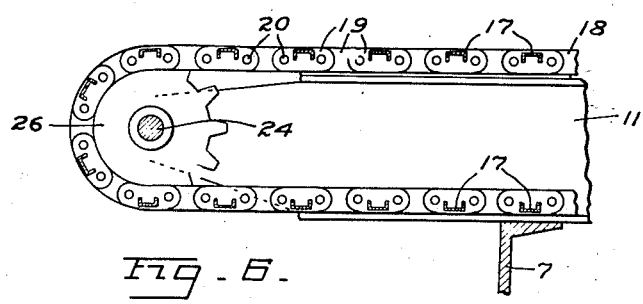

Figure 1 shows a side elevation of a vehicle made in accordance with my invention, with the near side lowered and partly cut away to disclose the floor construction, Figure 2 a plan view of the same vehicle, Figure 3 a fragmentary transverse section taken along line 3—3 of Figure 1, Figure 4 a rear view of a rear corner section of the vehicle, Figure 5 an enlarged detail view of the operating mechanism for the movable floor as seen in the central portion of Figure 1, and Figure 6 a detail view of a portion of the conveyor forming the movable floor.

While I have shown only the preferred form of my invention I wish to have it understood that various changes or modifications may be made within the scope of the claims hereto attached without departing from the spirit of the invention.

Referring to the drawings in detail, the vehicle 1 which may be a trailer, a truck, a sled or any other kind of vehicle of any suitable or preferred construction, is here shown as comprising two pairs of wheels 2, axles 3 supported thereby, springs 4 resting on the axles, short channels 5 supported by the springs, cross-members 6 connecting the channels and two main frame members 7 resting on the channels and extending longitudinally of the vehicle through the full length thereof and in spaced relation to one another. These main frame members terminate in the front and in the rear in upright members 8 to which the end plates 9 of the vehicle body are attached.

The main frame members 7 also serve as support for four transverse channels 10, 11, 12 and 13. The channel 10 runs along the front edge of the vehicle and has its flanges turned backward so as to form an upper and a lower rail for the conveyor chains to be hereinafter described. The channel 13 runs along the rear edge of the vehicle and its flanges are turned in a forward direction. The two channels 11 and 12 are mounted in the central portion of the vehicle, back to back, with an intervening space, with the flanges turned toward the front and rear channels respectively so as to form cooperating tracks therewith.

Four longitudinal channels 14, of smaller cross-section than the transverse channels, extend through the webs thereof, as shown in Figure 3, and serve as braces for the entire structure while at the same time they support two intermediate cross-members 15 and 16 which support intermediate sections of the conveyors.

The movable floor consists of two conveyor sections, a front section and a rear section both of which are substantially identical in form and function. Each conveyor comprises a plurality of bars 17, made in the form of channels, with the flat faces out, and chains 18 at opposite ends for holding the bars in spaced relation and for advancing the conveyors. The chains may be made in any suitable manner and are here shown as comprising two lines of links 19 pivotally connected by cross pins 20, each alternate link of one line being welded to the end of one of the conveyor bars. Rollers 21 are mounted on the pins and are made to ride on track bars 22 placed on the upper and lower flanges of the cross-channels 10–13.

Each conveyor is also provided with a central chain 23 in addition to the end chains and constructed in a similar manner, and the upper portions of these chains ride on the cross-members 15 and 16 respectively.

For driving and tensioning the conveyors I provide two shafts 24 and 25 at the ends of the conveyors and along the side edges of the vehicle, the shaft 24 being the drive shaft and the shaft 25 an idler shaft. The drive shaft is suitably mounted in web extensions of the cross-channels 10 to 13 and is provided with six sprockets 26, one each for the four end chains of the two conveyor sections and one each for the two intermediate chains. The sprockets are positioned in alinement with the flanges of the cross-channels so that the chain links may travel in a smooth path from the upper flange over the sprocket upon the lower channel and vice versa upon a reversal of the rotation of the sprocket.

The drive shaft extends through the entire length of the vehicle bed and is provided with drive means between the two central channels, the drive means comprising a worm gear 27 fixed to the shaft and a worm 28 running transversely underneath the worm gear and being mounted on a transverse shaft 29 which extends through the full width of the vehicle bed and is provided with squared or angular heads at each end so that it may be operated by means of a crank handle from either side of the vehicle. It is apparent that a power drive could be readily substituted for the manual actuation.

The worm gear and the worm are preferably enclosed in a housing 30 disposed between the two central transverse channels 11 and 12 and the space between the two channels is bridged by a roof 31 which keeps material from falling through between the channels.

The idler shaft 25 is mounted on the opposite side of the vehicle bed and is also provided with six sprockets to pair with the sprockets on the drive shaft in tensioning the chains of the conveyor sections. The idler shaft is supported in such a manner that it can be adjusted for taking up any slack in the conveyor that may develop and for increasing the tension under which the conveyor is held. For this purpose I provide the mounting means shown in Figure 4 which illustrates the rear mounting and is matched by a corresponding front mounting. The mounting comprises a slide 32 having a bearing for the shaft 25 and being guided between two bars 33 fixed to the rear cross-channel. The slide has a projecting lug 34 through which a bolt 35 is threaded, the bolt bearing on a lug 36 projecting from the cross-channel so that when the bolt is screwed in the direction of the lug 36 the slide is forced outward and the conveyor is placed under greater tension for taking up the slack. The slide is formed with a slot 37, through which a bolt 38 is threaded into the channel 13 for locking the slide in adjusted position.

The slides 32 of the front and rear channel have extensions 39 which serve as supporting means for the adjacent side 40 which is pivoted in the extensions as shown at 41 so that the side is adjusted with the shaft and always occupies the same relative position to the conveyor no matter to what position the shaft is adjusted. No adjusting means is provided for the power shaft and its side plate 42 which latter is hinged in extensions 43 of the front and rear cross-channels. If adjustability of the power shaft and the side adjacent thereto were found to be desirable it could, of course, be easily effected in the same manner as on the opposite side of the vehicle except that similar means would also have to be provided for an adjustment of the worm drive and its housing.

The sides of the vehicle may be dropped from vertical to any angular position desired and held in adjusted relation by means of the chains 44. They may be locked in vertical position by any suitable locking means not shown.

The operation of the device will be readily understood from the foregoing description. The vehicle may be loaded with merchandise or farm produce in a conventional manner. The bars of the conveyor are spaced to hold the produce, such as lettuce heads, for instance, while allowing dirt and other foreign matter to drop between the same. As the load increases the heads of lettuce or the like are pressed firmly upon the conveyor and are made to partly interlock with the spaced bars. For unloading one of the sides is let down, either into horizontal position to serve as a platform from which the produce is removed manually or into declining position to serve as a chute. The operator then applies his crank handle to the end of the transverse shaft 29, from either side of the vehicle, and by turning the shaft imparts slow movement to the conveyor which moves as a whole and advances the entire load toward the first side for discharge upon the hinged side plate.

Since the floor moves with equal ease in both directions the load may be discharged over either side edge of the vehicle.

The two sections of the conveyor are firmly supported on the different tracks so that there is no danger of sagging. In case a slack should develop in time it can readily be taken up in the manner described by adjustment of the idler shaft which is arranged in such a manner that the relative position of the adjacent side to the idler shaft is not disturbed.

I claim:

1. A vehicle having an endless conveyor as a floor to receive objects thereon, means for moving the conveyor whereby the objects are discharged over the end thereof, the said means including a pair of sprocket shafts, adjustable supporting means for one of the shafts whereby the tension of the conveyor may be adjusted, and a plate pivoted relative to the conveyor for movement between vertical and angular positions to serve as a stop for the objects or as a receiving platform for the same, the plate being pivoted to the adjustable shaft supporting means so as to partake of any shaft adjustment and to retain the same relative position to the conveyor.

2. A vehicle comprising a supporting structure, two endless conveyors carried thereby to form a floor for the vehicle, the conveyors being mounted in spaced and parallel relation with respect to each other and arranged for movement from side to side of the vehicle, power transmission means for actuating the conveyors mounted in the space between the conveyors, and a roof overlying the power transmission means and bridging across the space between the conveyor ends.

3. A vehicle comprising a supporting structure, two endless conveyors carried thereby to form a floor for the vehicle, the conveyors being mounted in spaced and parallel relation with respect to each other and arranged for movement from side to side of the vehicle, power transmission means for actuating the conveyors mounted in the space between the conveyors, and a roof overlying the power transmission means and bridging across the space between the conveyor ends, the roof being curved in transverse section and elevated above the conveyors to direct material disposed thereon toward the conveyors.

4. A vehicle having an endless conveyor as a floor to receive objects thereon, means for moving the conveyor for discharging the objects over an end of the conveyor, the said means including a pair of shafts, adjustable supporting means for one of the shafts whereby the tension of the conveyor may be adjusted, and a plate serving as a discharge ramp secured to the adjustable shaft supporting means so as to partake of any shaft adjustment and to retain the plate in the same relative position to the conveyor.

5. In a vehicle, a supporting structure, a movable floor carried thereby, a side for the vehicle movable to be converted into a horizontal platform adjacent to the floor, and substantially on the level therewith, and means operable by a person standing in front of the platform for moving the floor, whereby the load carried by the floor is discharged upon the platform under the control of the operator.

6. In a vehicle, a supporting structure, a movable floor carried thereby, a side for the vehicle movable to be converted into a horizontal platform adjacent to the floor, and substantially on a level therewith, and means operable by a person standing in front of the platform for moving the floor, whereby the load carried by the floor is discharged upon the platform under the control of the operator, the operating means being disposed substantially midway between the ends of the floor.

7. A vehicle comprising a supporting structure, two endless conveyors carried thereby to form a floor for the vehicle, the conveyors being mounted in spaced relation with respect to each other, power transmission means for actuating the conveyors mounted in the space between the conveyors, and a roof overlying the power transmission means and bridging across the space between the conveyor ends, the roof being made to divert material thereon toward the conveyors.

JEAN C. RENAULT.